United States Patent
Kimura et al.

(10) Patent No.: US 6,756,415 B2
(45) Date of Patent: Jun. 29, 2004

(54) FLEXIBLE POLYURETHANE FOAM AND METHOD FOR ITS PRODUCTION

(75) Inventors: Yuuji Kimura, Kashima-gun (JP); Takayuki Sasaki, Kashima-gun (JP); Etsuko Akagi, Yokohama (JP)

(73) Assignee: Asahi Glass Company, Limited, Tokyo (JP)

( * ) Notice: Subject to any disclaimer, the term of this patent is extended or adjusted under 35 U.S.C. 154(b) by 0 days.

(21) Appl. No.: 10/302,957

(22) Filed: Nov. 25, 2002

(65) Prior Publication Data

US 2003/0130367 A1 Jul. 10, 2003

(30) Foreign Application Priority Data

Nov. 29, 2001 (JP) .................................. 2001-364193

(51) Int. Cl.[7] .............................................. C08G 18/28
(52) U.S. Cl. ...................... 521/170; 521/112; 521/174
(58) Field of Search ................................ 521/112, 170, 521/174

(56) References Cited

U.S. PATENT DOCUMENTS

| 5,093,380 A | 3/1992 | Takeyasu et al. |
| 5,100,922 A | 3/1992 | Wada et al. |
| 5,437,822 A | 8/1995 | Wada et al. |
| 5,674,920 A | 10/1997 | Obata et al. |
| 5,777,175 A * | 7/1998 | Ohkubo et al. ............. 568/619 |
| 6,201,035 B1 | 3/2001 | Tuinman et al. |
| 6,313,060 B1 | 11/2001 | Sugiyama et al. |

FOREIGN PATENT DOCUMENTS

| EP | 0 394 487 | 10/1990 |
| EP | 0 443 614 | 8/1991 |
| JP | 46-27250 | 8/1971 |
| JP | 1-280413 | 11/1989 |
| JP | 2-175713 | 7/1990 |
| JP | 4-145123 | 5/1992 |
| JP | 9-124764 | 5/1997 |
| JP | 9-302066 | 11/1997 |
| JP | 11-286566 | 10/1999 |
| JP | 2000-290344 | 10/2000 |
| JP | 2002-520460 | 7/2002 |
| WO | WO 00/17836 | 3/2000 |

* cited by examiner

*Primary Examiner*—John M. Cooney
(74) *Attorney, Agent, or Firm*—Oblon, Spivak, McClelland, Maier & Neustadt, P.C.

(57) ABSTRACT

A flexible polyurethane foam having a core impact resilience of at most 40%, of which the half-width of the resonance transmission peak in the resonance curve is at most 1 Hz.

19 Claims, 1 Drawing Sheet

FLEXIBLE POLYURETHANE FOAM AND METHOD FOR ITS PRODUCTION

BACKGROUND OF THE INVENTION

1. Field of the Invention

The present invention relates to a flexible polyurethane foam and a method for its production.

2. Description of the Background

In recent years, along with the progress of automobile industry, it has been required not only to improve the performance of cars but also to improve the interior design and the interior comfort of the vehicles. Particularly, with a view to improving sitting comfort and riding comfort, it has been strongly desired to develop a flexible polyurethane foam (hereinafter referred to as a flexible foam) for seats having better cushion properties. Especially, in recent years, with respect to a low resilience flexible foam which is regarded as excellent in body pressure reducing, it has been desired to develop one excellent in cushion properties, more specifically vibration properties. Further, with respect to the vibration properties, it is desired to take a substantial damping especially in the frequency region sensitive to person (which is said to be, e.g. from 4 to 8 Hz or from 6 to 20 Hz).

Heretofore, it is known to employ a low resilience flexible foam for seats for vehicles (e.g. JP-A-1-280413 and JP-A-2-175713). However, in the techniques disclosed in such applications, the compression set of the flexible foam was large (poor), and the durability was inadequate. Further, in recent years, low resilience flexible foams excellent in durability have also been proposed (e.g. JP-A-9-124764, JP-A-9-302066, JP-A-11-286566, JP-A-2000-290344 and JP-T-2002-520460 (WO00/04071)). However, such conventional low resilience flexible foams did not show distinct resonance frequencies in the above-mentioned specific frequency region. In such a case, it is difficult to reduce the vibration transmissibility over the entire specific frequency region while maintaining the physical properties such as hardness, durability, etc. required for cushion, and no means to solve such a problem has been known.

It is an object of the present invention to solve the above-mentioned problem and to provide a flexible foam excellent in vibration properties, while maintaining the physical properties such as hardness, durability, etc. required for cushion, in spite of its low resilience.

Heretofore, it has been attempted to reduce the vibration transmissibility over the entirety of the above-mentioned specific frequency region solely by the flexible foam. Whereas, the present invention is based on a concept such that a flexible foam is made to have a distinct resonance frequency, which can be absorbed by a structure such as a metal spring, so that as the entire seat, it is possible to provide one having low vibration transmissibility. Based on this concept, a further study has been carried out, and as a result, the present inventors have found that it is possible to let a low resilience flexible foam have a distinct resonance frequency by using a specific foam stabilizer at the time of producing the flexible foam, and have accomplished the present invention.

SUMMARY OF THE INVENTION

The present invention provides the following flexible foam: A flexible polyurethane foam having a core impact resilience of at most 40%, of which the half-width of the resonance transmission peak in the resonance curve is at most 1 Hz. This flexible foam has characteristic vibration properties even if it is of low resilience, and when a seat cushion is made thereof, it is possible to present one having low vibration transmissibility as the entire seat.

Further, the present invention provides the following method to produce the above flexible foam: A method for producing a flexible polyurethane foam, which comprises reacting a polyol having a hydroxyl value of from 10 to 56 mgKOH/g and an unsaturation value of at most 0.045 meq/g, with a polyisocyanate compound, in the presence of a catalyst and a blowing agent by using, as a foam stabilizer, a compound which has a polysiloxane chain and a polyoxyalkylene chain and has a silicone content of from 10 to 50 mass %, wherein the chain length of the polyoxyalkylene chain is at most 1000, and which has a hydroxyl group at the terminal of the polyoxyalkylene chain.

By this production method, it is possible to provide the above-mentioned flexible foam having characteristics in the vibration properties. Particularly, by using the specific foam stabilizer for the production of the low resilience flexible foam, the above-mentioned vibration properties can be obtained, and good moldability can be obtained. Further, by using the above-mentioned polyol, it is possible to obtain a flexible foam which is excellent in durability and which has a prescribed hardness and good moldability. Here, the reason why it is possible to obtain the vibration properties which have not been accomplished heretofore in spite of low resilience, is believed to be such that the cell structure of the flexible foam is unique. Namely, the flexible foam of the present invention has a characteristic such that in addition to a usual cell structure (the cell diameter is from 500 to 2,000 μm), fine cells (the cell diameter is from 50 to 200 μm) are formed also in columnar structures corresponding to ribs.

Further, as the above polyol, it is preferred to use a polyol produced by means of a double metal cyanide complex catalyst. By using this polyol, it is possible to obtain a flexible foam having superior durability.

Further, it is preferred that an oxyethylene group is present in the polyoxyalkylene chain of the foam stabilizer, and the oxyethylene group content in the polyoxyalkylene chain is from 70 to 100 mass %. By combining such a foam stabilizer as the above-mentioned specific foam stabilizer with the above-mentioned polyol, good moldability can be obtained.

Further, it is preferred to employ tolylene diisocyanate as at least a part of the above-mentioned polyisocyanate compound. By using tolylene diisocyanate, it is possible to obtain a flexible foam which is of low resilience and which exhibits good mechanical properties.

DETAILED DESCRIPTION OF THE INVENTION

Now, the present invention will be described in further detail with reference to the preferred embodiments.

The present invention provides a flexible foam having a core impact resilience of at most 40%, of which the half-width of the resonance transmission peak in the resonance curve is at most 1 Hz. Here, the measurement of the core impact resilience is carried out by a method in accordance with JIS K6400, and the measurement of the vibration properties (the resonance curve) is carried out by a method in accordance with JASO B407-87, wherein the vibrational amplitude is ±2.5 mm, the pressing platen is of Tekken type, and the load is 490 N. Here, the core means that a portion having the surface skin portion removed from the center portion of a flexible foam sample, is used for the measurement.

Further, the half-width of the resonance transmission peak in the resonance curve being at most 1 Hz, means that in a graph showing the result (the resonance curve) obtained by measuring the vibration properties, in which the abscissa represents the frequency (unit: Hz) and the ordinate represents the vibration transmissibility (no unit), the vibration transmissibility shows a mountain shape (a resonance transmission peak) as between before and after the resonance frequency, whereby the width of the frequency between two points at $2^{-1/2}$ fold of the vibration transmissibility at the resonance frequency (the maximum value of the vibration transmissibility, which is referred to also as the resonance transmissibility) is at most 1 Hz.

Specifically, this may be represented as follows.

When the resonance frequency is represented by $f_n$, the resonance transmissibility by $V_{fn}$, the transmissibility at the frequency $f_a$ by $V_{fa}$ and the transmissibility at the frequency $f_b$ by $V_{fb}$, $V_{fa}$ and $V_{fb}$ satisfy the following formula (1), and $f_a$ is larger than $f_b$.

$$V_{fa} = V_{fb} = \frac{V_{fn}}{\sqrt{2}} \tag{1}$$

Here, the above-mentioned width of the frequency (the half-width) df is defined by the following formula (2):

$$df = f_a - f_b \tag{2}$$

The flexible foam of the present invention is a low resilience flexible foam, and its core impact resilience is at most 40%, preferably at most 35%. Further, the flexible foam of the present invention is such that the half-width of the resonance transmission peak in the resonance curve is at most 1 Hz. To satisfy such vibration properties means to have a distinct resonance frequency.

Figure 1:
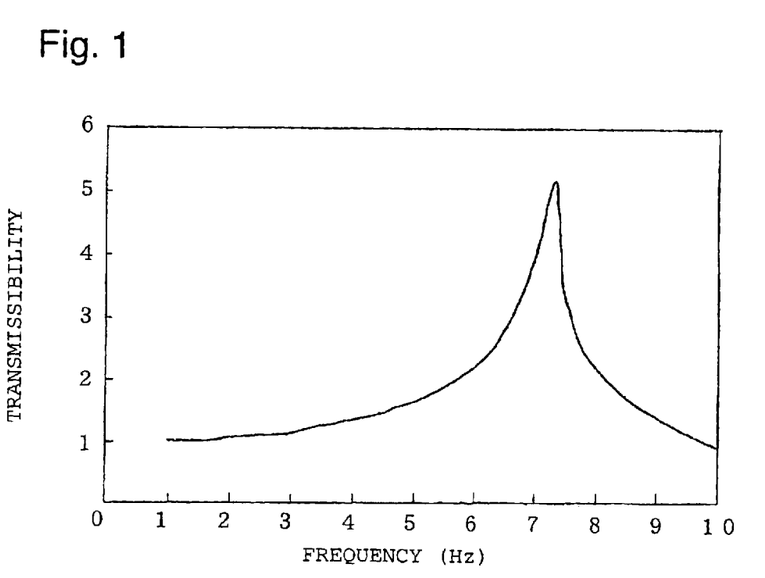
FIG. 1 shows an example of the results of measurement of the vibration properties of a flexible foam of the present invention.
Figure 2:
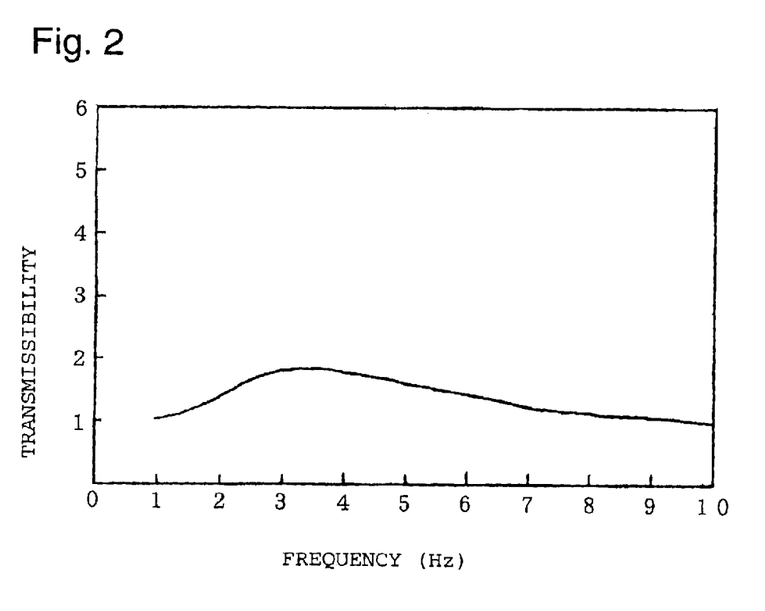
FIG. 2 shows an example of the results of measurement of the vibration properties of a conventional flexible foam having a core impact resilience of at most 40%.

In FIG. 1, an example of the results of measurement of the vibration properties of a flexible foam of the present invention, is shown. The abscissa represents the vibration frequency (unit: Hz), and the ordinate represents the vibration transmissibility. As a comparative example, FIG. 2 shows an example of the results of measurement of the vibration properties of a conventional flexible foam having a core impact resilience of at most 40%. As is evident from the comparison, in the case of the conventional flexible foam, no distinct resonance frequency is observed over the entirety of the measured region. Whereas, with the flexible foam of the present invention, a distinct resonance frequency is observed in the vicinity of 7 Hz, and the vibration transmissibility is controlled to be relatively low at other regions.

In order to provide the above-mentioned flexible foam, the present invention also provides a method for producing a flexible polyurethane foam which comprises reacting a polyol having a high molecular weight with a polyisocyanate compound in the presence of a catalyst and a blowing agent by using a specific foam stabilizer.

Here, the above specific foam stabilizer is compound (a silicone foam stabilizer) which has a polysiloxane chain and a polyoxyalkylene chain and has a silicone content of from 10 to 50 mass %, wherein the chain length of the polyoxyalkylene chain is at most 1,000, and which has a hydroxyl group at the terminal of the polyoxyalkylene chain. Further, it is preferred that an oxyethylene group is present in the polyoxyalkylene chain of the foam stabilizer, and the oxyethylene group content in the polyoxyalkylene chain is from 70 to 100 mass %.

The above specific foam stabilizer has a polysiloxane chain and a polyoxyalkylene chain. Here, the polysiloxane chain means an organopolysiloxane chain having an organic group in a side chain, and as an example thereof, a dimethylsiloxane chain may be mentioned. The polyoxyalkylene chain means a portion having an alkylene oxide added. The addition of an alkylene oxide may, for example, be a blocked addition having a single alkylene oxide added, a random addition having two or more alkylene oxides randomly added, etc. These additions may be present as mixed. The structure of such foam stabilizer may be a blocked structure of the polysiloxane chain and the polyoxyalkylene chain, or a structure having a polyoxyalkylene chain grafted as a side chain to a polysiloxane chain as the main chain. The structure having a polyoxyalkylene chain grafted as a side chain to a polysiloxane chain as the main chain, is preferred, since the moldability of the flexible foam is thereby excellent.

The silicone content of the above-mentioned specific foam stabilizer is from 10 to 50 mass %, preferably from 30 to 50 mass %. Here, the silicone content is the proportion of the polysiloxane chain in the foam stabilizer, and the rest is the polyoxyalkylene chain. If the above silicone content is less than 10 mass %, the moldability of the flexible foam tends to deteriorate, and it tends to be difficult to obtain the desired vibration properties. Further, if the above silicone content exceeds 50 mass %, the moldability of the flexible foam tends to deteriorate, such being undesirable.

The above alkylene oxide may, for example, be ethylene oxide, propylene oxide, 1,2-epoxybutane or 2,3-epoxybutane. Among them, ethylene oxide only or a combination of ethylene oxide with propylene oxide, is preferred. As a specific content of ethylene oxide, the content of an oxyethylene group in the above polyoxyalkylene chain is preferably from 70 to 100 mass %, more preferably from 90 to 100 mass %. If the above content of an oxyethylene group is less than 70 mass %, the moldability of the flexible foam tends to deteriorate, such being undesirable.

Further, the chain length of the above polyoxyalkylene chain, is at most 1,000, preferably at most 500. Here, the chain length is a value corresponding to the molecular weight. For example, if the polyoxyalkylene chain is composed solely of polyoxyethylene groups, and if its chain length is 880, such a case represents a polyoxyalkylene chain having 20 ethylene oxides (molecular weight: 44) added. If this chain length exceeds 1,000, the moldability of the flexible foam tends to deteriorate, such being undesirable. Further, the above polyoxyalkylene chain has a hydroxyl group at the terminal. However, it is unnecessary that all terminals are hydroxyl groups, and one having the hydrogen atom of the hydroxyl group substituted by a monovalent organic group, may be contained. The proportion of hydroxyl groups among the terminals is such that the proportion of hydroxyl groups among all terminals of the polyoxyalkylene chain is preferably from 50 to 100 mol %, more preferably from 70 to 100 mol %, particularly preferably 100 mol %, i.e. all terminal groups are hydroxyl groups.

If the above proportion is less than 50 mol %, the moldability of the flexible foam tends to deteriorate, such being undesirable. The above-mentioned monovalent organic group may, for example, be an alkyl group such as a methyl group, an ethyl group or an isopropyl group; an aryl group such as a phenyl group; or an acyl group such as an acetyl group. Among them, an organic group having from 1 to 6 carbon atoms is preferred.

In the method for producing a flexible foam of the present invention, two or more types of the above-mentioned specific foam stabilizers may be used in combination, or the above-mentioned specific foam stabilizer may be used in combination with a foam stabilizer other than the above specific foam stabilizer. In the production of the flexible foam of the present invention, the amount of the specific foam stabilizer is preferably from 0.01 to 5 parts by mass, more preferably from 0.1 to 2 parts by mass, per 100 parts by mass of the polyol (excluding a crosslinking agent). If the amount is less than 0.01 part by mass, the foam stability at the time of producing the flexible foam, tends to deteriorate, such being undesirable. On the other hand, if the amount exceeds 5 parts by mass, shrinkage of the flexible foam tends to result at the time of producing the flexible foam, such being undesirable.

In the method for producing a flexible foam of the present invention, a polyol having a high molecular weight is used. This high molecular weight polyol is preferably a polyol having a hydroxyl value of from 10 to 56 mgKOH/g and an unsaturation value of at most 0.045 meq/g. This high molecular weight polyol will hereinafter be referred to as a "specific polyol". As such a specific polyol, a polyol produced by means of a double metal cyanide complex catalyst is particularly preferred.

The above specific polyol can be obtained by ring opening addition polymerization of an alkylene oxide to an initiator. It is preferred to employ a double metal cyanide complex catalyst as a catalyst for this ring opening addition polymerization.

The above-mentioned initiator may, for example, be a polyhydric alcohol such as ethylene glycol, propylene glycol, 1,4-butanediol, glycerol, trimethylolpropane, pentaerythritol, diglycerol, meso-erythritol, methylglucoside, glucose or sorbitol; an amine such as ethylenediamine, diethylenediamine, triethylenediamine, diaminodiphenylmethane, hexamethylenediamine or propylenediamine; or a condensed compound such as a phenol resin or a novolak resin. Two or more such active hydrogen compounds may be used in combination, or they may be used in combination with an active hydrogen compound having at least 7 active hydrogen atoms such as sucrose. Among these active hydrogen compounds, a polyhydric alcohol is preferred. Further, a compound obtained by ring opening addition of an alkylene oxide such as propylene oxide to the above-mentioned initiator, may be used as the initiator.

The alkylene oxide to be polymerized to the initiator by the ring opening addition polymerization, may, for example, be ethylene oxide, propylene oxide, 1,2-butylene oxide, 2,3-butylene oxide, epichlorohydrin or styrene oxide. It is preferred to use ethylene oxide and propylene oxide in combination.

As the catalyst for ring opening addition polymerization to be used for the production of the above specific polyol, it is possible to employ a catalyst whereby a conventional polyoxyalkylene polyol having a low unsaturation value can be obtained. For example, a cesium type catalyst, a double metal cyanide complex catalyst, a phosphazenium compound catalyst may be mentioned. Among them, a double metal cyanide complex catalyst is preferred. When the double metal cyanide complex catalyst is employed, a polyol having a low unsaturation value can be obtained. When a polyol having a low unsaturation value is used as a raw material, a flexible foam excellent in durability can be obtained.

As the double metal cyanide complex, a complex containing zinc hexacyanocobaltate as the main component, is preferred, and its ether and/or alcohol complex is preferred. As the composition, one disclosed in JP-B-46-27250 can be essentially employed. As the ether, monoethylene glycol dimethyl ether (glyme), diethylene glycol dimethyl ether (diglyme), ethylene glycol mono-tert-butyl ether (METB), ethylene glycol mono-tert-pentyl ether (METP), diethylene glycol mono-tert-butyl ether (DETB) or tripropylene glycol monomethyl ether (TPME) may, for example, be preferred. As the alcohol, tert-butyl alcohol as disclosed in JP-A-4-145123 is preferred.

The hydroxyl value of the above specific polyol is from 10 to 56 mgKOH/g, more preferably from 10 to 46 mgKOH/g. If the hydroxyl value is less than 10 mgKOH/g, the curing of the flexible foam may sometimes be inadequate, such being undesirable. On the other hand, if it exceeds 56 mgKOH/g, the elasticity of the flexible foam tends to be inadequate, such being undesirable. Further, the number of hydroxyl groups of this specific polyol is preferably from 2 to 8, more preferably from 2.8 to 5.2. Here, the number of hydroxyl groups means an average value of the number of active hydrogen in the initiator. If the number of hydroxyl groups is less than 2, the flexible foam tends to be soft, and the compression set tends to deteriorate. On the other hand, if the number of hydroxyl groups exceeds 8, the flexible foam tends to be hard, and the mechanical properties such as elongation of the foam tend to deteriorate. Further, the oxyethylene group content in this specific polyol is preferably at most 30 mass %, more preferably at most 20 mass %. If the oxyethylene group content in the polyol exceeds 30 mass %, the durability (particularly the wet heat compression set) tends to deteriorate, such being undesirable.

Further, the unsaturation value of this polyol is at most 0.045 meq/g, preferably at most 0.04 meq/g, particularly preferably at most 0.035 meq/g. If the unsaturation value exceeds 0.045 meq/g, such may adversely affect the physical properties such as elongation, strength, etc., of the flexible foam, and the durability of the flexible foam tends to be inadequate, such being undesirable. Such specific polyols may be used alone or in combination as a mixture of two or more of them. In a case where two or more of them are used in combination, the above hydroxyl value, the number of hydroxyl group and the unsaturation value are calculated by mass-averaging the corresponding values of the respective polyols to be combined.

The above-mentioned specific polyol may be a polymer-dispersed polyol containing fine particles of a polymer. The polymer-dispersed polyol is a dispersion system having fine polymer particles (dispersoid) stably dispersed in a base polyol (dispersing medium), wherein the polymer may be an addition polymerized polymer or a polycondensed polymer.

The fine polymer particles in the polymer-dispersed polyol are made of an addition polymerized polymer such as a homopolymer or copolymer of acrylonitrile, styrene, a methacrylic acid ester, an acrylic acid ester or other vinyl monomer, or a polycondensed polymer such as a polyester, a polyurea, a polyurethane or a melamine resin. Among them, an acrylonitrile/styrene copolymer is preferred. By the presence of such fine polymer particles, the hydroxyl value of the entire polymer-dispersed polyol is usually lower than the hydroxyl value of the base polyol, and is effective for improvement of the physical properties such as the hardness, air permeability, etc. of the flexible foam. The content of such fine polymer particles in the polymer-dispersed polyol is usually preferably at most 50 mass %. The amount of the fine polymer particles may not necessarily be large. If it is too large, there may be a disadvantage from the economical viewpoint or from the viewpoint of the viscosity. The content of the fine polymer particles may be changed depending upon the hardness of the flexible foam to be produced, but it is usually preferably from 3 to 35 mass %. Various properties (the unsaturation value, the hydroxyl value, etc.) as a polyol, of the polymer-dispersed polyol, are considered to be based on the base polyol excluding the fine polymer particles.

The flexible foam of the present invention is preferably produced by reacting the above-mentioned specific polyol with a polyisocyanate compound in the presence of the above-mentioned specific foam stabilizer, a catalyst for urethane-forming reaction and a blowing agent.

The polyisocyanate compound to be used in the present invention is not particularly limited. It may, for example, be a polyisocyanate of e.g. aromatic type, alicyclic type or aliphatic type having at least two isocyanate groups; a mixture of two or more such polyisocyanates; or a modified polyisocyanate obtained by modification thereof. Specifically, polyisocyanates such as tolylene isocyanate (TDI), diphenylmethane diisocyanate (MDI), polymethylenepolyphenyl polyisocyanate (so-called crude MDI), xylylene diisocyanate (XDI), isophorone diisocyanate (IPDI) and hexamethylene diisocyanate (HMDI), or their prepolymer type modified products, isocyanurate modified products, urea modified products and carbodiimide modified products, may, for example, be mentioned. Among them, TDI, MDI, crude MDI or a modified product thereof, is preferred. Further, it is more preferred to employ TDI as at least a part of the polyisocyanate compound. Here, it is particularly preferred to use TDI alone, to use TDI and MDI in combination, or to use TDI and crude MDI in combination. It is most preferred to employ TDI alone or to use TDI and crude MDI in combination (provided that TDI is used at least 50 mass %, based on the total amount of TDI and crude MDI).

The amount of the polyisocyanate compound to be used, is usually represented by an isocyanate index (numerical value represented by 100 times of the number of isocyanate groups to the total number of all active hydrogen of the polyol, the crosslinking agent, water, etc.), and the amount of the polyisocyanate compound to be used in the present invention, is preferably from 80 to 120, more preferably from 85 to 110, by the isocyanate index. If the isocyanate index is less than 80, the durability tends to deteriorate such being undesirable. On the other hand, if the isocyanate index exceeds 120, the time (the curing time) for producing the flexible foam tends to be long, such being undesirable.

Further, the catalyst for urethane-forming reaction is not particularly limited so long as it is a catalyst to accelerate a urethane-forming reaction. For example, a tertiary amine such as triethylenediamine, bis(2-dimethylaminoethyl) ether or N,N,N',N'-tetramethylhexamethylenediamine; a metal carboxylate such as potassium acetate or potassium 2-ethylhexanoate; or an organic metal compound such as dibutyltin dilaurate, may be mentioned. Among the tertiary amines, a catalyst for urethane-forming reaction having a hydroxyl group in its molecule, may be employed. As such an example, dimethylhexanolamine or dimethylethanolamine may be mentioned.

Further, the blowing agent is not particularly limited, but it is preferably one or more members selected from the group consisting of low boiling point hydrocarbons, low boiling point fluorinated compounds, water and inert gases. Specifically, the low boiling hydrocarbons include, for example, cyclopentane and n-pentane. The low boiling point fluorinated compounds may specifically be low boiling point hydrofluorocarbons such as 1,1,1,2-tetrafluoroethane (HFC-134a), 1,1,1,2,3,3-hexafluoropropane (HFC-236ea), 1,1,1,3,3-pentafluoropropane (HFC-245fa) and 1,1,1,3,3-pentafluorobutane (HFC-365mfc); and low boiling point fluorinated ethers such as 1,1,2,2-tetrafluoroethyl difluoromethyl ether (HFE-236 pc), 1,1,2,2-tetrafluoroethyl methyl ether (HFE-254 pc) and 1,1,1,2,2,3,3-heptafluoropropyl methyl ether (HFE-347mcc). As the inert gases, air, nitrogen and carbon dioxide gas, may, for example, be specifically mentioned. Among them, it is preferred to employ water as a blowing agent. The amount of the blowing agent to be used, is not particularly limited. When water is employed, it is used preferably in an amount of at most 10 parts by mass, more preferably from 0.1 to 8 parts by mass, per 100 parts by mass of the polyol.

In the method for producing a flexible foam of the present invention, optional additives may be used in addition to the above-described foam stabilizer, catalyst and blowing agent. As such additives, a crosslinking agent; a filler such as calcium carbonate or barium sulfate; a surfactant such as an emulsifier; an age-preventive agent such as an antioxidant or an ultraviolet absorber; a flame retardant, plasticizer, a coloring agent, an antifungal agent, a cell opener, a dispersing agent and a discoloration-preventive agent, may, for example, be mentioned.

As such a crosslinking agent, a compound having at least two functional groups having active hydrogen, such as hydroxyl groups, primary amino groups or secondary amino groups, is preferred. Further, the molecular weight of the crosslinking agent is preferably less than 2,000, more preferably at most 1,500, particularly preferably at most 1,000. Further, two or more crosslinking agents may be used in combination. Specific examples include compounds such as ethylene glycol, propylene glycol, 1,4-butanediol, neopentyl glycol, 1,6-hexanediol, diethylene glycol, diethylene glycol, dipropylene glycol, glycerol, trimethylolpropane, pentaerythritol, diglycerol, dextrose, sorbitol, sucrose, monoethanolamine, diethanolamine, triethanolamine, bisphenol A, ethylenediamine, 3,5-diethyl-2,4-(or 2,6)-diaminotoluene (DETDA), 2-chloro-p-phenylenediamine (CPA), 3,5-bis(methylthio)-2,4(or 2,6)-diaminotoluene, 1-trifluoromethyl-4-chloro-3,5-diaminobenzene, 2,4-toluenediamine, 2,6-toluenediamine, bis(3,5-dimethyl-4-aminophenyl)methane, 4,4'-diaminodiphenylmethane, m-xylylenediamine, 1,4-diaminohexane, 1,3-bis (aminomethyl)cyclohexane and isophoronediamine and compounds obtained by adding a relatively small amount of an alkylene oxide thereto.

In the method for producing a flexible foam of the present invention, the foaming method may be either a method wherein a reactive mixture is poured into an open frame, followed by foaming (a slab foaming), or a method wherein a reactive mixture is injected into a closed mold, followed by foaming (a molding foaming). The flexible foam of the present invention can be produced by either a cold cure method or a hot cure method, but a cold cure method is preferred.

Further, the conditions for producing the flexible foam of the present invention are not particularly limited so long as they are conditions capable of producing the flexible foam.

For example, the flexible foam can be produced by adjusting the polyisocyanate compound and the mixture of all raw materials other than the polyisocyanate compound (hereinafter referred to as a polyol system) to from 15 to 40° C., respectively, adding a predetermined amount of the polyisocyanate compound to the polyol system, stirring and mixing them by e.g. a high speed mixer for from 2 to 15 seconds, and then immediately putting and sealing the mixture in a container heated to from 30 to 80° C., followed by curing for from 4 to 20 minutes.

The flexible foam of the present invention is most suitable for seat cushions, but may also be preferably used for bedding, mats, usual cushions, etc.

Now, the present invention will be described in further detail with reference to Examples. However, it should be understood that the present invention is by no means restricted to such specific Examples. Examples 1 to 10 represent Examples of the present invention, and Examples 11 to 15 represent Comparative Examples. Further, the numerical values in columns for foam formulations in Examples represent parts by mass.

Further, the number of hydroxyl groups, the content of oxyethylene (EO) groups (unit: mass %), the hydroxyl value (unit: mgKOH/g) and the unsaturation value (unit: meq/g) of a polyol used in each Example, are shown in Table 1. The measurement of the unsaturation value was carried out by a method in accordance with JIS K1557. Hereinafter, the DMC-METB complex catalyst represents a zinc hexacyanocobaltate/monoethylene glycol mono-tert-butyl ether complex catalyst, the DMC-glyme complex catalyst represents a zinc hexacyanocobaltate/glyme complex catalyst, the CsOH catalyst represents a cesium hydroxide catalyst, the KOH catalyst represents a potassium hydroxide catalyst. Further, initiator 1 is a compound having propylene oxide added to glycerol and having a hydroxyl value of 168 mgKOH/g.

Production of Polyol A1

In the presence of 1,000 g of initiator 1, by using the DMC-glyme complex catalyst, 5,321 g of propylene oxide was reacted at about 120° C., and then, by using the KOH catalyst, 1,029 g of ethylene oxide was reacted at about 120° C. to complete the polymerization. After the reaction, treatment with an adsorbent (synthetic magnesium silicate) and filtration were carried out to obtain polyol A1 having a hydroxyl value of 24.0 mgKOH/g.

Production of Polyol A2

In the presence of 1,000 g of initiator 1, by using the DMC-METB complex catalyst, 4,865 g of propylene oxide was reacted at about 120° C., and then, by using the KOH catalyst, 1,117 g of ethylene oxide was reacted at about 120° C. to complete the polymerization. After the reaction, treatment with an adsorbent (synthetic magnesium silicate) and filtration were carried out to obtain polyol A2 having a hydroxyl value of 24.8 mgKOH/g.

Production of Polyol B

In the presence of 1,000 g of initiator 1, by using the CsOH catalyst, 5,024 g of propylene oxide was reacted at about 110° C., and then 1,325 g of ethylene oxide was reacted at about 120° C. to complete the polymerization. After the reaction, treatment with an adsorbent (synthetic magnesium silicate) and filtration were carried out to obtain polyol B1 having a hydroxyl value of 24.0 mgKOH/g.

Production of Polyol C1

In the presence of 1,000 g of initiator 1, by using the KOH catalyst, 5,024 g of propylene oxide was reacted at about 110° C., and then 1,317 g of ethylene oxide was reacted at about 120° C. to complete the polymerization. After the reaction, treatment with an adsorbent (synthetic magnesium silicate) and filtration were carried out to obtain polyol C1 having a hydroxyl value of 28.3 mgKOH/g.

Production of Polyol C2

In the presence of 1,000 g of initiator 1, by using the KOH catalyst, 5,222 g of propylene oxide was reacted at about 110° C., and then 1,098 g of ethylene oxide was reacted at about 120° C. to complete the production. After the reaction, treatment with an adsorbent (synthetic magnesium silicate) and filtration were carried out to obtain polyol C2 having a hydroxyl value of 28.5 mgKOH/g.

Production of Polyol C3

In the presence of 1,000 g of initiator 1, by using the KOH catalyst, 3,100 g of propylene oxide was reacted at about 110° C., and then 600 g of ethylene oxide was reacted at about 120° C. to complete the polymerization. After the reaction, treatment with an adsorbent (synthetic magnesium silicate) and filtration were carried out to obtain polyol C3 having a hydroxyl value of 42.0 mgKOH/g.

Production of Polyol C4

In the presence of glycerol as the initiator, by using the KOH catalyst, a mixture of propylene oxide and ethylene oxide was reacted. After the reaction, treatment with an adsorbent (synthetic magnesium silicate) and filtration were carried out to obtain polyol C4 having an oxyethylene group content of 80 mass % and a hydroxyl value of 48.0 mgKOH/g. Polyol C4 was incorporated as a cell opener.

TABLE 1

| Polyol | Number of hydroxyl groups | Contents of EO groups (mass %) | Hydroxyl value (mgKOH/g) | Unsaturation value (meq/g) |
|---|---|---|---|---|
| A1 | 3 | 14 | 24.0 | 0.021 |
| A2 | 3 | 16 | 24.8 | 0.023 |
| B | 3 | 18 | 24.0 | 0.039 |
| C1 | 3 | 18 | 28.3 | 0.067 |
| C2 | 3 | 15 | 28.5 | 0.065 |
| C3 | 3 | 15 | 42.0 | 0.039 |
| C4 | 3 | 80 | 48.0 | 0.001 |

Using the materials as identified in Table 2 in the amounts as identified in Tables 3, 4 and 5, flexible foams were prepared. The blend ratio was adjusted so that the isocyanate index (referred to simply as NCO index in the Tables) at the time of the preparation became 105 or 90. Among these materials and blend agents, the polyol system and the polyisocyanate compound solution were respectively adjusted to a liquid temperature of 25±1° C., and a predetermined amount of the polyisocyanate compound was added to the polyol system, followed by stirring and mixing by a high speed mixer for 5 seconds, and the mixture was immediately injected into an aluminum mold of 400 mm×400 mm×100 mm in height heated to 60° C., and sealed. After curing for 6 minutes, the flexible foam was taken out and left to stand for at least 24 hours, whereupon various physical properties were measured.

TABLE 2

| | |
|---|---|
| Crosslinking agent E1 | A compound which is a sequential adduct of propylene oxide and ethylene oxide to sorbitol and which has a hydroxyl value of 450 mgKOH/g and an oxyethylene group content of 46 mass % |
| Crosslinking agent E2 | Diethanolamine |
| Crosslinking agent E3 | Glycerol |
| Catalyst F1 | A dipropylene glycol (DPG) solution of triethylenediamine (tradename: TEDA L-33, manufactured by TOSOH CORPORATION) |
| Catalyst F2 | A DPG solution of bis-[(2-dimethylamino)ethyl] ether (tradename: TOYOCAT ET, manufactured by TOSOH CORPORATION) |
| Foam stabilizer G1 | Silicone foam stabilizer (tradename: L-3601, manufactured by Nippon Unicar) The proportion of terminal hydroxyl groups of the polyoxyalkylene chain is 0 mol %, the oxyethylene group content in the same chain is from 90 to 100 mass %, the chain length of the same chain is at most 500, and the silicone content in the foam stabilizer is larger than 50 mass %. |
| Foam stabilizer G2 | Silicone foam stabilizer (tradename: L-5421, manufactured by Nippon Unicar Co., Ltd.) The proportion of the terminal hydroxyl groups of the polyoxyalkylene chain is 100 mol %, the oxyethylene group content in the same chain is from 90 to 100 mass %, the chain length of the same chain is at most 500, and the silicone content in the foam stabilizer is from 30 to 40 mass %. |
| Foam stabilizer G3 | Silicone foam stabilizer (tradename: L-5420, manufactured by Nippon Unicar Co., Ltd.) The proportion of the terminal hydroxyl groups of the polyoxyalkylene chain is 100 mol %, the oxyethylene group content in the same chain is from 90 to 100 mass %, the chain length of the same chain is at most 500, and the silicone content in the foam stabilizer is from 40 to 50 mass %. |
| Foam stabilizer G4 | Silicone foam stabilizer (tradename: L-5309, manufactured by Nippon Unicar Co., Ltd.) The proportion of the terminal hydroxyl groups of the polyoxyalkylene chain is 100 mol %, the oxyethylene group content in the same chain is from 90 to 100 mass %, the chain length of the same chain is at most 500, and the silicone content in the foam stabilizer is larger than 50 mass %. |
| Blowing agent | Water |
| Polyol D | A polymer-dispersed polyol having acrylonitrile/styrene copolymer particles (35 mass %) dispersed in a dispersant of polyol C2 (65 mass %). |
| Polyisocyanate | A mixture of TDI-80 (mixture of 2,4-TDI/2,6-TDI = 80/20 mass %)/crude MDI = 80/20 mass %, isocyanate group content: 44.8 mass % (tradename: Coronate 1021, manufactured by Nippon Polyurethane Industry Co., Ltd.) |

The results of measurement of various physical properties of the flexible foams are shown in Tables 3, 4 and 5. As an index for moldability, evaluation of the crushing property was carried out. For the evaluation of the crushing property, after taking out from the mold, the foam was immediately compressed to 25% of the thickness of the foam, whereby the operation efficiency at the time of releasing the foam cell was evaluated, and symbol ○ represents "good", and symbol Δ represents "slightly poor". Further, the methods for measuring the physical properties of the foam were in accordance with the following methods. With respect to the core density, one cut out in a size of 100 mm×100 mm×50 mm in height from the center portion of the foam and having the skin portion removed, was used for the measurement. Further, the total unsaturation value in Tables 3, 4 and 5, represents an unsaturation value of the total of the polyol and the base polyol of the polymer-dispersed polyol, and its unit is meq/g.

Further, the durability of the flexible foam of the present invention can be evaluated by the compression set. The dry heat compression set is preferably at most 5%, more preferably at most 3%. Further, the wet heat compression set is preferably at most 15%, more preferably at most 13%. Further, the resonance transmissibility means the vibration transmissibility at the resonance frequency, and the half-width means the half-width of the resonance transmission peak in the resonance curve.

Further, the body pressure reducing of the flexible foam of the present invention can be evaluated by measuring the static spring constant. The method for its measurement is a load test in accordance with the performance test method of a pad material of an automobile sheet of JASO automobile standards B408-89. As a pressure plate, a circular plate having a diameter of 200±2 mm and a thickness of from 50 to 100 mm is employed. A test sample is placed on a horizontal table of the tester, and the pressure plate attached to the tester is placed at the center of the upper surface of the test sample. As preliminary compression, compression is carried out once under a load of 700 N, and after removing the load, the sample is left to stand for from 3 to 5 minutes, and then an initial load of 5 N is exerted, whereby the thickness (t0) is measured, and this is taken as the initial thickness. The center point on the pressed surface at that time is taken as the original point, and after adjusting the load meter to 0, pressurizing and depressurizing are carried out at a rate of from 150 to 300 mm/min, whereby the deflection corresponding to the load is measured.

From the measured results, a load/deflection curve is prepared with respect to the relation between the load and the deflection. As the test sample, a box type test piece (size: 400×400 mm, thickness: 100 mm) overall (one taken out from the box mold without removing the skin layer) for measuring the basic physical properties of the foams, is employed. The static spring constant is the tangent value of a tangent line on the pressurizing side at each load in the load/deflection curve. Specifically, a load/deflection curve is contained by the above test, and the static spring constant (X) at a load of 98N was obtained from the curve and evaluated. This static spring constant (X) being small means that the body pressure reducing is good. More specifically, it is preferably at most 40 N/mm, more preferably at most 15 N/mm, especially preferably at most 10 N/mm.

Now, the standards used for the measurements of the physical properties of the flexible foams are shown below. The total density (unit: $kg/m^3$), the core density (unit: $kg/m^3$), the 25% hardness (ILD) (unit: $N/314\ cm^2$), the CLD hardness (unit: $N/cm^2$), the core impact resilience (unit: %), the dry heat compression set (unit: %) and the wet heat compression set (unit: %) were measured by methods in accordance with JIS K6400. The resonance frequency (unit: Hz) and the vibration transmissibility (no unit) were measured by methods in accordance with JASO B407-87 (vibration amplitude: ±2.5 mm, vibration plate: Tekken type, load: 490 N). The static spring constant (unit: N/mm) was measured by a method in accordance with JASO B408-89.

Further, in the Tables, CLD hardness 1 is a CLD hardness measured at room temperature (23° C.), and CLD hardness 2 is a CLD hardness measured at a low temperature (−25° C.). The hardness ratio is a value obtained by dividing the value of CLD hardness 2 by the value of CLD hardness 1. The closer this hardness ratio to 1, the smaller the change in change of the hardness depending upon the temperature change, whereby even at a low temperature, the flexibility will not be impaired.

Further, the results of the measurements of the vibration properties shown in the drawings are such that FIG. 1 is an example of the results of the measurements of the flexible foam obtained in Example 7, and FIG. 2 is an example of the results of the measurements of the flexible foam obtained in Example 11.

TABLE 3

| | Examples | | | | |
|---|---|---|---|---|---|
| | 1 | 2 | 3 | 4 | 5 |
| Polyol | A1: 60 D: 40 | A1: 60 D: 40 | A1: 40 D: 60 | A2: 40 D: 60 | A1: 60 D: 40 |
| Total unsaturation value (meq/g) | 0.034 | 0.034 | 0.043 | 0.044 | 0.034 |
| Crosslinking agent E1 | 3.0 | 3.0 | 3.0 | 3.0 | 3.0 |
| Crosslinking agent E2 | 2.0 | 2.0 | 2.0 | 2.0 | 2.0 |
| Catalyst F1 | 0.5 | 0.5 | 0.5 | 0.5 | 0.5 |
| Catalyst F2 | 0.12 | 0.12 | 0.07 | 0.07 | 0.07 |
| Foam stabilizer G2 | 0.8 | 0.4 | 1 | 1 | — |
| Foam stabilizer G3 | — | — | — | — | 0.4 |
| Foam stabilizer G4 | 0.4 | 0.8 | — | — | 0.8 |
| Blowing agent | 3.0 | 3.0 | 3.0 | 3.0 | 3.0 |
| NCO Index | 105 | 105 | 105 | 105 | 105 |
| Moldability | ○ | ○ | ○ | ○ | ○ |
| Total density (kg/m³) | 50.8 | 50.0 | 49.7 | 49.9 | 50.1 |
| Core density (kg/m³) | 44.1 | 44.3 | 44.5 | 43.5 | 44.4 |
| 25% hardness (N/314 cm²) | 198 | 223 | 390 | 370 | 221 |
| CLD hardness 1 (N/cm²) | 0.604 | 0.675 | 1.178 | 1.110 | 0.665 |
| CLD hardness 2 (N/cm²) | 0.616 | 0.695 | 1.225 | 1.143 | 0.678 |
| Hardness ratio | 1.02 | 1.03 | 1.04 | 1.03 | 1.02 |
| Core impact resilience (%) | 29 | 32 | 33 | 34 | 35 |
| Dry heat compression set (%) | 3.1 | 2.6 | 3.3 | 3.2 | 2.8 |
| Wet heat compression set (%) | 12.4 | 9.2 | 14.1 | 14.5 | 9.5 |
| Resonance frequency (Hz) | 6.1 | 6.2 | 5.9 | 5.9 | 6.1 |
| Resonance transmissibility | 5.2 | 5.5 | 5.9 | 5.8 | 5.1 |
| Half-width (Hz) | 0.60 | 0.55 | 0.50 | 0.52 | 0.65 |
| Static spring constant (X) (N/mm) | 22.3 | 31.7 | 70.6 | 62.9 | 30.9 |

TABLE 4

| | Examples | | | | |
|---|---|---|---|---|---|
| | 6 | 7 | 8 | 9 | 10 |
| Polyol | A1: 30 B: 30 D: 40 | A1: 100 C4: 1 | A1: 100 C4: 1 | A2: 100 C4: 1 | A1: 60 B: 40 C4: 1 |
| Total unsaturation value (meq/g) | 0.041 | 0.021 | 0.021 | 0.023 | 0.028 |
| Crosslinking agent E1 | 3.0 | — | — | — | — |
| Crosslinking agent E2 | 2.0 | 0.2 | 0.2 | 0.2 | 0.2 |
| Crosslinking agent E3 | — | 1.0 | 1.0 | 1.0 | 1.0 |
| Catalyst F1 | 0.5 | 0.7 | 0.7 | 0.7 | 0.7 |
| Catalyst F2 | 0.12 | — | — | — | — |
| Foam stabilizer G2 | 1 | 1 | — | 1 | 1 |
| Foam stabilizer G3 | — | — | 1 | — | — |
| Foam stabilizer G4 | — | 0.2 | 0.2 | 0.2 | 0.2 |

TABLE 4-continued

|  | Examples | | | | |
| --- | --- | --- | --- | --- | --- |
|  | 6 | 7 | 8 | 9 | 10 |
| Blowing agent | 3.0 | 2.3 | 1.7 | 2.3 | 2.3 |
| NCO Index | 105 | 90 | 90 | 90 | 90 |
| Moldability | ○ | ○ | ○ | ○ | ○ |
| Total density (kg/m$^3$) | 51.1 | 60.6 | 83.2 | 60.0 | 61.2 |
| Core density (kg/m$^3$) | 45.5 | 53.9 | 78.9 | 54.3 | 54.5 |
| 25% hardness (N/314 cm$^2$) | 200 | 120 | 178 | 130 | 121 |
| CLD hardness 1 (N/cm$^2$) | 0.610 | 0.365 | 0.534 | 0.397 | 0.366 |
| CLD hardness 2 (N/cm$^2$) | 0.634 | 0.368 | 0.539 | 0.409 | 0.370 |
| Hardness ratio | 1.04 | 1.01 | 1.01 | 1.02 | 1.01 |
| Core impact resilience (%) | 30 | 23 | 25 | 24 | 26 |
| Dry heat compression set (%) | 3.5 | 3.9 | 2.5 | 4.3 | 4.1 |
| Wet heat compression set (%) | 11.4 | 10.2 | 7.5 | 11.5 | 11.6 |
| Resonance frequency (Hz) | 6.7 | 7.1 | 6.9 | 6.7 | 7.0 |
| Resonance transmissibility | 5.5 | 5.2 | 5.6 | 5.3 | 6.0 |
| Half-width (Hz) | 0.70 | 0.65 | 0.62 | 0.66 | 0.70 |
| Static spring constant (X) (N/mm) | 23.0 | 3.8 | 11.2 | 5.5 | 4.0 |

TABLE 5

|  | Examples | | | | |
| --- | --- | --- | --- | --- | --- |
|  | 11 | 12 | 13 | 14 | 15 |
| Polyol | C3: 60 D: 40 | A1: 60 D: 40 | A1: 60 D: 40 | A2: 40 D: 60 | C1: 70 D: 30 |
| Total unsaturation value (meq/g) | 0.047 | 0.034 | 0.034 | 0.044 | 0.067 |
| Crosslinking agent E1 | 3.0 | 3.0 | 3.0 | 3.0 | 3.0 |
| Crosslinking agent E2 | 2.0 | 2.0 | 2.0 | 2.0 | 2.0 |
| Catalyst F1 | 0.5 | 0.5 | 0.5 | 0.5 | 0.5 |
| Catalyst F2 | 0.12 | 0.12 | 0.12 | 0.07 | 0.05 |
| Foam stabilizer G1 | — | — | 1 | 1 | — |
| Foam stabilizer G2 | — | — | — | — | 0.3 |
| Foam stabilizer G4 | 1 | 1 | — | — | 0.7 |
| Blowing agent | 3.0 | 3.0 | 3.0 | 3.0 | 3.0 |
| Moldability | Δ | ○ | Δ | Δ | Cracked |
| NCO Index | 105 | 105 | 105 | 105 | 105 |
| Total density (kg/m$^3$) | 50.5 | 50.4 | 50.2 | 50.5 | — |
| Core density (kg/m$^3$) | 44.3 | 43.9 | 42.8 | 43.6 | — |
| 25% hardness (N/314 cm$^2$) | 260 | 233 | 269 | 350 | — |
| CLD hardness 1 (N/cm$^2$) | 0.775 | 0.697 | 0.807 | 1.120 | — |
| CLD hardness 2 (N/cm$^2$) | 0.837 | 0.718 | 0.839 | 1.165 | — |
| Hardness ratio | 1.08 | 1.03 | 1.04 | 1.04 | — |
| Core impact resilience (%) | 39 | 55 | 64 | 57 | — |
| Dry heat compression set (%) | 7.0 | 2.7 | 4.9 | 4.7 | — |
| Wet heat compression set (%) | 15.3 | 8.0 | 17.1 | 16.2 | — |

TABLE 5-continued

| | Examples | | | | |
|---|---|---|---|---|---|
| | 11 | 12 | 13 | 14 | 15 |
| Resonance frequency (Hz) | 4.6 | 3.9 | 3.7 | 3.8 | — |
| Resonance transmissibility | 2.3 | 3.5 | 6.9 | 6.5 | — |
| Half-width (Hz) | 2.60 | 2.00 | 0.85 | 1.40 | — |
| Static spring constant (X) (N/mm) | 46.9 | 35.6 | 48.7 | 65.9 | — |

In Examples 1 to 10, the specific foam stabilizer is used, and the specific polyol is used, whereby the prescribed vibration properties can be obtained in spite of low resilience, the moldability is also good, and the durability is also good.

Further, in Examples 7 to 10, the value of the static spring constant (X) is small, and the body pressure reducing is good. Example 11 represents a conventional example of a low resilience flexible foam, wherein the specific foam stabilizer is not used, whereby the prescribed vibration properties can not be obtained, and the moldability is also inadequate.

Examples 12 to 14 represent examples for a relatively high resilience flexible foam, and the specific foam stabilizer is not used, whereby the moldability is inadequate, and the durability, particularly the wet heat compression set, is poor.

In Example 15, the specific foam stabilizer is used, but instead of the specific polyol, a polyol having a high unsaturation value is used, whereby the moldability is poor, and the physical properties can not be measured.

From these results, it is evident that the moldability becomes good by the use of the specific foam stabilizer, the physical properties such as durability and hardness become good, and the moldability becomes excellent by the use of the specific polyol, and the characteristic vibration properties can be obtained by the combination of the specific foam stabilizer and the specific polyol.

The flexible foam of the present invention is excellent in vibration properties while maintaining physical properties such as hardness and durability, required for cushion, in spite of the low resilience. Especially when combined with a metal spring or the like, a seat cushion having a low vibration transmissibility, can be obtained. Further, it has low resilience and is excellent in the body pressure reducing, whereby it is useful also for bedding, mattress, etc.

The entire disclosure of Japanese Patent Application No. 2001-364193 filed on Nov. 29, 2001 including specification, claims, drawings and summary is incorporated herein by reference in its entirety.

What is claimed is:

1. A flexible polyurethane foam having a core impact resilience of at most 40%, of which the half-width of the resonance transmission peak in the resonance curve is at most 1 Hz.

2. The flexible polyurethane foam according to claim 1, which is produced by reacting a polyol having a hydroxyl value of from 10 to 56 mgKOH/g and an unsaturation value of at most 0.045 meq/g, with a polyisocyanate compound, in the presence of a catalyst and a blowing agent by using, as a foam stabilizer, a compound which has a polysiloxane chain and a polyoxyalkylene chain and has a silicone content of from 10 to 50 mass %, wherein the chain length of the polyoxyalkylene chain is at most 1000, and which has a hydroxyl group at the terminal of the polyoxyalkylene chain.

3. The flexible polyurethane foam according to claim 2, wherein as the polyol, a polyol produced by means of a double metal cyanide complex catalyst is used.

4. The flexible polyurethane foam according to claim 2, wherein an oxyethylene group is present in the polyoxyalkylene chain of the foam stabilizer, and the oxyethylene group content in the polyoxyalkylene chain is from 70 to 100 mass %.

5. The flexible polyurethane foam according to claim 2, wherein tolylene diisocyanate is employed as at least a part of the polyisocyanate compound.

6. The flexible polyurethane foam according to claim 3, wherein an oxyethylene group is present in the polyoxyalkylene chain of the foam stabilizer, and the oxyethylene group content in the polyoxyalkylene chain is from 70 to 100 mass %.

7. The flexible polyurethane foam according to claim 3, wherein tolylene diisocyanate is employed as at least a part of the polyisocyanate compound.

8. A method for producing a flexible polyurethane foam, which comprises reacting a polyol having a hydroxyl value of from 10 to 56 mgKOH/g and an unsaturation value of at most 0.045 meq/g, with a polyisocyanate compound, in the presence of a catalyst and a blowing agent by using, as a foam stabilizer, a compound which has a polysiloxane chain and a polyoxyalkylene chain and has a silicone content of from 10 to 50 mass %, wherein the chain length of the polyoxyalkylene chain is at most 1000, and which has a hydroxyl group at the terminal of the polyoxyalkylene chain.

9. The method for producing a flexible polyurethane foam according to claim 8, wherein as the polyol, a polyol produced by means of a double metal cyanide complex catalyst is used.

10. The method for producing a flexible polyurethane foam according to claim 8, wherein an oxyethylene group is present in the polyoxyalkylene chain of the foam stabilizer, and the oxyethylene group content in the polyoxyalkylene chain is from 70 to 100 mass %.

11. The method for producing a flexible polyurethane foam according to claim 8, wherein tolylene diisocyanate is employed as at least a part of the polyisocyanate compound.

12. The method for producing a flexible polyurethane foam according to claim 9, wherein an oxyethylene group is present in the polyoxyalkylene chain of the foam stabilizer, and the oxyethylene group content in the polyoxyalkylene chain is from 70 to 100 mass %.

13. The method for producing a flexible polyurethane foam according to claim 9, wherein tolylene diisocyanate is employed as at least a part of the polyisocyanate compound.

14. A method for producing a flexible polyurethane foam, which comprises reacting a polyol having a hydroxyl value of from 10 to 56 mgKOH/g and an unsaturation value of at most 0.045 meq/g, with a polyisocyanate compound, in the presence of a catalyst and a blowing agent by using, as a foam stabilizer, a compound which has a polysiloxane chain and a polyoxyalkylene chain and has a silicone content of from 10 to 50 mass %, wherein the chain length of the polyoxyalkylene chain is at most 1000, and which has a hydroxyl group at the terminal of the polyoxyalkylene chain, to produce a flexible polyurethane foam having a core impact resilience of at most 40%, of which the half-width of the resonance transmission peak in the resonance curve is at most 1 Hz.

15. The method for producing a flexible polyurethane foam according to claim 14, wherein as the polyol, a polyol produced by means of a double metal cyanide complex catalyst is used.

16. The method for producing a flexible polyurethane foam according to claim 14, wherein an oxyethylene group is present in the polyoxyalkylene chain of the foam stabilizer, and the oxyethylene group content in the polyoxyalkylene chain is from 70 to 100 mass %.

17. The method for producing a flexible polyurethane foam according to claim 14, wherein tolylene diisocyanate is employed as at least a part of the polyisocyanate compound.

18. The method for producing a flexible polyurethane foam according to claim 15, wherein an oxyethylene group is present in the polyoxyalkylene chain of the foam stabilizer, and the oxyethylene group content in the polyoxyalkylene chain is from 70 to 100 mass %.

19. The method for producing a flexible polyurethane foam according to claim 15, wherein tolylene diisocyanate is employed as at least a part of the polyisocyanate compound.

* * * * *